United States Patent
Guduri et al.

(10) Patent No.: US 11,539,315 B1
(45) Date of Patent: Dec. 27, 2022

(54) DRIVER CIRCUIT FOR FULL-BRIDGE DC MOTOR DRIVER SYSTEM

(71) Applicant: Texas Instruments Incorporated, Dallas, TX (US)

(72) Inventors: Venkatesh Guduri, Bangalore (IN); Venkata Naresh Kotikelapudi, Bangalore (IN); Ganapathi Shankar Krishnamurthy, Bangalore (IN); Ashish Ojha, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/357,812

(22) Filed: Jun. 24, 2021

(51) Int. Cl.
  *H02P 9/30* (2006.01)
  *H02P 7/03* (2016.01)

(52) U.S. Cl.
  CPC ..................... *H02P 7/04* (2016.02)

(58) Field of Classification Search
  CPC .. H02P 7/04; H02P 9/30; H02P 9/305; H02M 7/5387; H02M 3/155
  See application file for complete search history.

(56) References Cited

U.S. PATENT DOCUMENTS

| | | | |
|---|---|---|---|
| 6,201,717 B1* | 3/2001 | Grant | H02M 3/1588 363/16 |
| 6,411,531 B1* | 6/2002 | Nork | H02M 3/073 363/60 |
| 7,746,676 B2* | 6/2010 | Feng | H02M 3/07 363/60 |
| 2011/0050322 A1* | 3/2011 | Sicard | H03K 17/164 327/419 |
| 2016/0359483 A1* | 12/2016 | Mukhopadhyay | H03K 17/74 |
| 2019/0379288 A1* | 12/2019 | Chaput | H02M 3/1582 |
| 2021/0247462 A1* | 8/2021 | Ojha | G01R 19/16519 |

* cited by examiner

*Primary Examiner* — Thai T Dinh
(74) *Attorney, Agent, or Firm* — John R. Pessetto; Frank D. Cimino

(57) ABSTRACT

A driver circuit includes a first switch which has a first terminal coupled to a voltage supply terminal, a second terminal coupled to a high-side gate, and a third terminal coupled to receive a voltage supply enable signal. The first switch is operable to connect the voltage supply terminal to the high-side gate responsive to the voltage supply enable signal. The driver circuit includes a second switch which has a first terminal coupled to a charge pump terminal, a second terminal coupled to the high side gate, and a third terminal coupled to receive a charge pump enable signal. The second switch is operable to connect the charge pump terminal to the high-side gate responsive to the charge pump enable signal.

25 Claims, 3 Drawing Sheets

US 11,539,315 B1

DRIVER CIRCUIT FOR FULL-BRIDGE DC MOTOR DRIVER SYSTEM

TECHNICAL FIELD

This description relates generally to DC motor driver systems.

BACKGROUND

In DC motor driver systems, two high-side and two low-side field effect transistors (FETs) are generally connected in a bridge configuration which provides two outputs. A DC motor is coupled between the two outputs. In order to turn on a high-side FET to drive the DC motor, the gate of the high-side FET must be charged to a voltage higher than the source of the high-side FET. Since the source of the high-side FET is at a supply voltage level when the high-side FET is on, the high-side gate must be charged to a voltage level that is higher than the supply voltage.

In order to turn on the high-side FET, an internal charge pump is used to supply current to charge the high-side gate to a voltage level that is higher than the supply voltage. The high-side FET is turned on in three phases. In a first phase, the gate to source voltage of the FET is ramped up above a threshold voltage, causing the FET to conduct current. In the first phase, the output voltage does not rise. In a second phase, the output voltage rises to the supply voltage, but in this phase the gate to source voltage does not change. In the second phase, the FET operates in a Miller Region. Finally, in a third phase, the gate to source voltage rises again but the output voltage does not change.

In the Miller Region, as the output voltage slews upward to the supply voltage, the gate draws current from the charge pump to maintain the gate voltage higher than the supply voltage. Due to the current drawn from the charge pump in the Miller Region, the voltage level of the charge pump dips, which adversely affects the operation of the driver system. Also, if the output is short circuited to ground, large current flows from the high-side gate to the source through a Zener diode. As a result, the voltage at the charge pump dips, which adversely affects the operation of the driver system.

SUMMARY

In one aspect, a driver circuit includes a first switch which has a first terminal coupled to a voltage supply terminal, a second terminal coupled to a high-side gate, and a third terminal coupled to receive a voltage supply enable signal. The first switch is operable to connect the voltage supply terminal to the high-side gate responsive to the voltage supply enable signal. The driver circuit includes a second switch which has a first terminal coupled to a charge pump terminal, a second terminal coupled to the high side gate, and a third terminal coupled to receive a charge pump enable signal. The second switch is operable to connect the charge pump terminal to the high-side gate responsive to the charge pump enable signal. The driver circuit includes a comparison circuit which has a first terminal coupled to the high-side gate and a second terminal coupled to the voltage supply terminal. The comparison circuit is operable to provide the voltage supply enable signal if the voltage at the high-side gate is lower than the supply voltage and to provide the charge pump enable signal if the voltage at the high-side gate is higher than the supply voltage.

In an additional aspect, responsive to the voltage supply enable signal, the first switch is closed to charge the high-side gate to the supply voltage, and responsive to the charge pump enable signal, the second switch is closed to charge the high-side gate to a charge pump voltage.

In an additional aspect, the first switch is operable to disconnect the voltage supply terminal from the high-side gate when the second switch is turned on, and the second switch is operable to disconnect the charge pump terminal from the high-side gate when the first switch is turned on.

In an additional aspect, a driver circuit includes a first switch which has a first terminal coupled to a voltage supply terminal, a second terminal coupled to a high-side gate, and a third terminal. The driver circuit includes a second switch which has a first terminal coupled to a charge pump terminal, a second terminal coupled to the high side gate, and a third terminal. The driver circuit includes a first PFET which has a source connected to the charge pump terminal, a drain, and a gate. The driver circuit includes a first NFET which has a drain connected to the source of the first PFET, a source connected to the voltage supply terminal, and a gate connected to the gate of the first PFET. The driver circuit includes a resistor connected between the charge pump terminal and the gate of the first PFET. The driver circuit includes a buffer which has an input connected to the drain of the first PFET and an output connected to the third terminal of the second switch. The driver circuit includes a source follower PFET which has a source connected to the gate of the first PFET, a gate connected to the voltage supply terminal, and a drain. The driver circuit includes a diode connected between the drain of the source follower PFET and the high-side gate. The driver circuit includes a level shifter which has an input connected to the output of the buffer circuit and an output connected to the third terminal of the first switch.

BRIEF DESCRIPTION OF THE DRAWINGS

The same reference numbers or other reference designators are used in the drawings to designate the same of similar (functionally and/or structurally) features.

DETAILED DESCRIPTION

Figure 1:
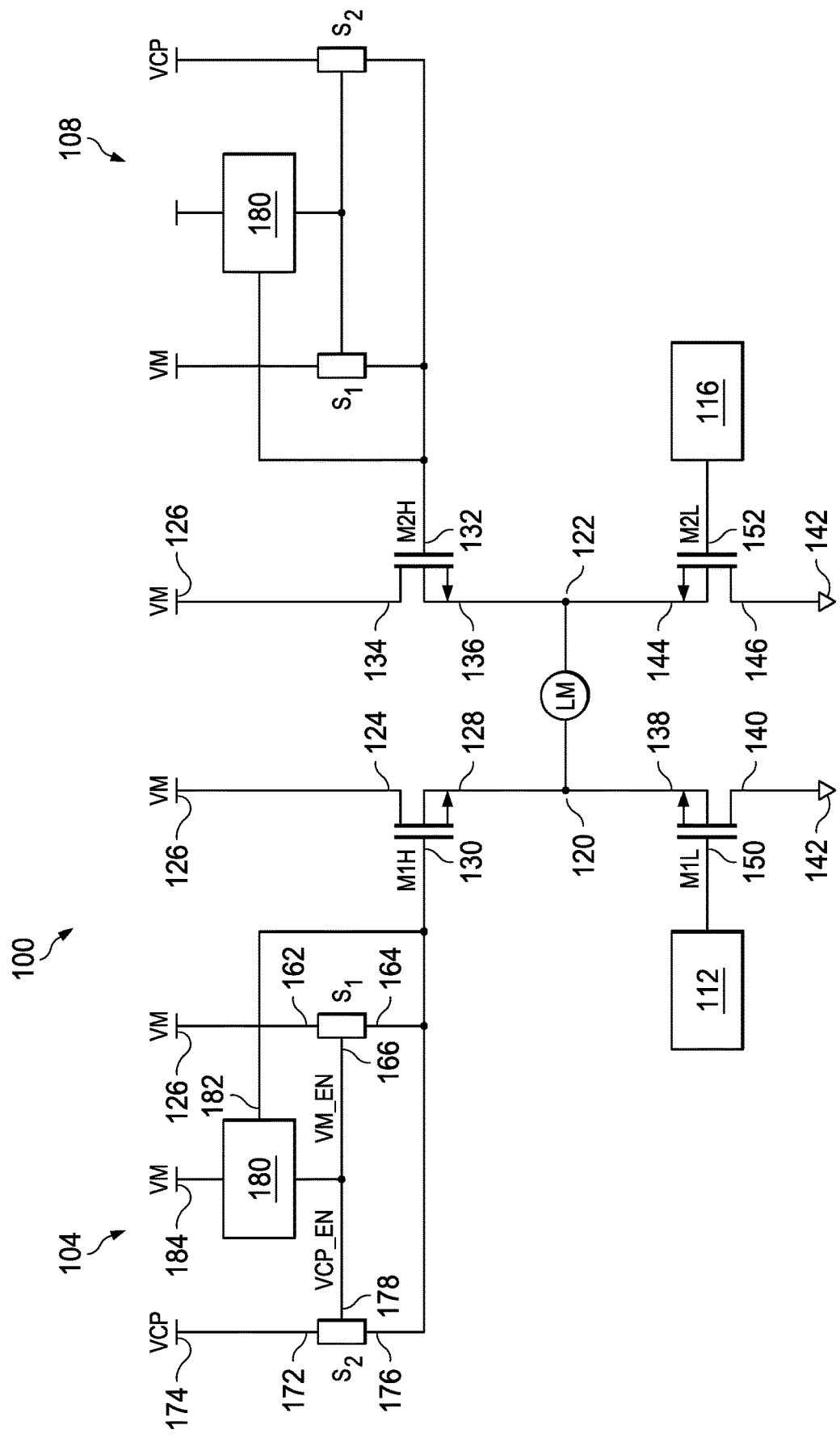
FIG. 1 is a block diagram of a driver system of an example embodiment.

FIG. 1 is a block diagram of a driver system 100 of an example embodiment. The system 100 is configured to drive a DC motor LM. The system 100 includes: (a) a first high-side driver circuit 104 configured to drive a first high-side field effect transistor (FET) M1H; (b) a second high-side driver circuit 108 configured to drive a high-side FET M2H; (a) a first low-side driver circuit 112 configured to drive a low-side FET M1L; and (d) a second low-side driver circuit 116 configured to drive a low-side FET M2L. The first and second high-side driver circuits 104 and 108 are configured similarly, and the first and second low-side driver circuits 112 and 116 are configured similarly.

The high-side FETs M1H, M2H and the low-side FETs M1L and M2L are connected in a full-bridge configuration providing first and second outputs 120 and 122. A DC motor represented by a load LM is coupled between the first and second outputs 120 and 122.

The high-side FET M1H has a first terminal 124 (e.g. a drain) connected to a voltage supply terminal 126 and has a second terminal 128 (e.g. a source) connected to the first output 120. The high-side FET M2H has a first terminal 134 (e.g. a drain) connected to the voltage supply terminal 126 and has a second terminal 136 (e.g. a source) connected to the second output 122. The FETs M1H and M2H have respective high-side control terminals (e.g. gates) 130 and 132. The voltage supply terminal 126 can be connected to a voltage supply VM (e.g., approximately 12V).

The low-side FET M1L has a first terminal 138 (e.g. a source) connected to the first output 120 and has a second terminal 140 (e.g. a drain) connected to a common potential (e.g. ground) terminal 142. The low-side FET M2L has a first terminal 144 (e.g. a source) connected to the second output 122 and has a second terminal 146 (e.g. a drain) connected to the common potential terminal 142. The FETs M1L and M2L have respective low-side control terminals (e.g. gates) 150 and 152. The common potential terminal 142 can be connected to a ground level voltage.

In an example embodiment, the high-side FET M1H is an n-channel field effect transistor (NFET). The FET M1H has a drain (124), a source (128), and a gate 130. The other FETs M2H, M1L and M2L are also NFETs each having a drain, a sources and a gate.

In an example embodiment, the driver circuit 104 is configured to drive the high-side FET M1H. The driver circuit 104 charges the high-side gate 130 to a voltage level that is higher than VM (e.g., VM+5V) by providing two conduction paths. Initially, the high-side gate 130 is charged from approximately 0 volt to approximately VM via a first conduction path by closing a first switch S1 and opening a second switch S2, and by connecting the supply voltage VM to the high-side gate 130. Next, the high-side gate 130 is charged from VM to a charge pump voltage VCP via a second conduction path by closing the second switch S2 and opening the first switch S1, and by connecting the charge pump VCP (e.g., approximately 20V) to the high-side gate 130. The first and second switches S1 and S2 are opened/closed complementarily.

Likewise, the driver circuit 108 is configured to charge the high-side gate 132 to a voltage level that is higher than VM by providing two conduction paths. Initially, the high-side gate 132 is charged from approximately zero volt to approximately VM via a first conduction path by connecting the supply voltage VM to the high-side gate 132. Next, the high-side gate 132 is charged from VM to a charge pump voltage VCP via the second conduction path by connecting VCP to the high-side gate 132. The design and operation of the driver circuit 108 are similar to the design and operation of the driver circuit 104.

In one aspect, the driver circuit 104 prevents VCP from dipping when the high-side gate 130 is charged from approximately 0 volt to VM by disconnecting the charge pump supply VCP from the high-side gate 130. Since only VM supplies current to the high-side gate 130 and VCP remains disconnected as the high-side gate 130 is charged to VM, VCP does not dip.

In an example embodiment, the high-side gate 130 is charged from approximately 0 volt to a threshold voltage VTH via the first conduction path by closing the first switch S1 and opening the second switch S2, thus connecting the supply voltage VM to the high-side gate 130. Next, the high-side gate 130 is charged from VTH to the charge pump voltage VCP via the second conduction path by closing the second switch S2 and opening the first switch S1, thus connecting the charge pump VCP to the high-side gate 130. The relationship between VTH and VM is expressed by the equation: VTH=VM−/+X (e.g., X=1, 2, 4, 5V).

The driver circuit 104 includes the first switch S1 which has a first terminal 162 connected to the voltage supply terminal 126, a second terminal 164 connected to the high-side gate 130, and a third terminal 166 configured to receive a voltage supply enable signal VM_EN. The first switch S1 is closed to connect the voltage supply terminal 126 to the high-side gate 130 responsive to the voltage supply enable signal VM_EN.

The driver circuit 104 includes a second switch S2 which has a first terminal 172 connected to a charge pump terminal 174, a second terminal 176 connected to the high side gate 130, and a third terminal 178 configured to receive a charge pump enable signal VCP_EN. The second second switch S2 is closed to connect the charge pump terminal 174 to the high-side gate 130 responsive to the charge pump enable signal VCP_EN.

The driver circuit 104 includes a comparison circuit 180 which has a first terminal 182 connected to the high-side gate 130 and a second terminal 184 connected to VM. The comparison circuit 180 provides the voltage supply enable signal VM_EN (thereby closing switch S1) if the voltage at the high-side gate 130 is lower than VM and provides the charge pump enable signal VCP_EN (thereby closing switch S2) if the voltage at the high-side gate 130 is higher than VM.

In order to turn on the high-side FET M1H, the high-side gate 130 must be charged to a voltage that is higher than the voltage at the source 128. Since the source 128 is at the supply voltage VM when the FET M1H is on, the high-side gate 130 must be charged to a voltage higher than VM. As discussed before, the driver circuit 104 charges the high-side gate 130 to a voltage that is higher than VM by relying on the two conduction paths. Initially, the high-side gate 130 is charged from approximately 0 V to VM via the first conduction path by closing the first switch S1 and opening the second switch S2, thus connecting the supply voltage VM to the high-side gate 130. Next, the high-side gate 130 is charged from VM to VCP (e.g., VCP=VM+5V) via the second conduction path by closing the second switch S2 and opening the first switch S1, thus connecting the charge pump VCP to the high-side gate 130.

In an example embodiment, if the voltage at the high-side gate 130 is less than VM, the comparison circuit 180 provides the voltage supply enable signal VM_EN to close the first switch S1, thus charging the high-side gate 130 from approximately zero volt to VM. When the high-side gate 130 reaches VM, the comparison circuit 130 provides the charge pump enable signal VCP_EN to close the second switch S2, thus charging the high-side gate 130 from VM to VCP. The first switch S1 is closed when the second switch S2 is opened, and vice versa. As described below, the driver circuit 104 prevents VCP from dipping when the first output 120 slews from zero volt to approximately VM, and also prevents VCP from dipping when the first output 120 is shorted to ground.

Due to the current drawn from VCP, the voltage level of VCP dips, which can adversely affect operation of conventional driver systems. In the driver system 100, VCP is disconnected from the high-side gate 130 and VM supplies current to the high-side gate 130 as the gate voltage is raised from 0 to VM. Only when the voltage at the high-side gate 130 is around VM, VCP is coupled to the high-side gate 130 to supply current to raise the voltage at the high-side gate from VM to VCP. Thus, VCP is required to supply less current to the high-side gate 130, which reduces loading on VCP. The effect of this is the risk of VCP dipping or collapsing is reduced as the first output 120 slews upward from zero to VM. Furthermore, VCP is often fabricated in a semiconductor chip as an internal charge pump requiring a large capacitor. The reduction of loading on VCP reduces the size of the capacitor, thus reducing the area needed in the semiconductor chip to implement the capacitor.

Thus, the use of supply voltage VM, in some example embodiments, while the voltage on the gate of the high-side transistor is low (e.g. less than VM) and during short-circuit events, reduces the risk that the charge pump (used to supply VCP) will collapse. In addition, it may facilitate the usage of smaller capacitors to implement the charge pump.

Figure 2:
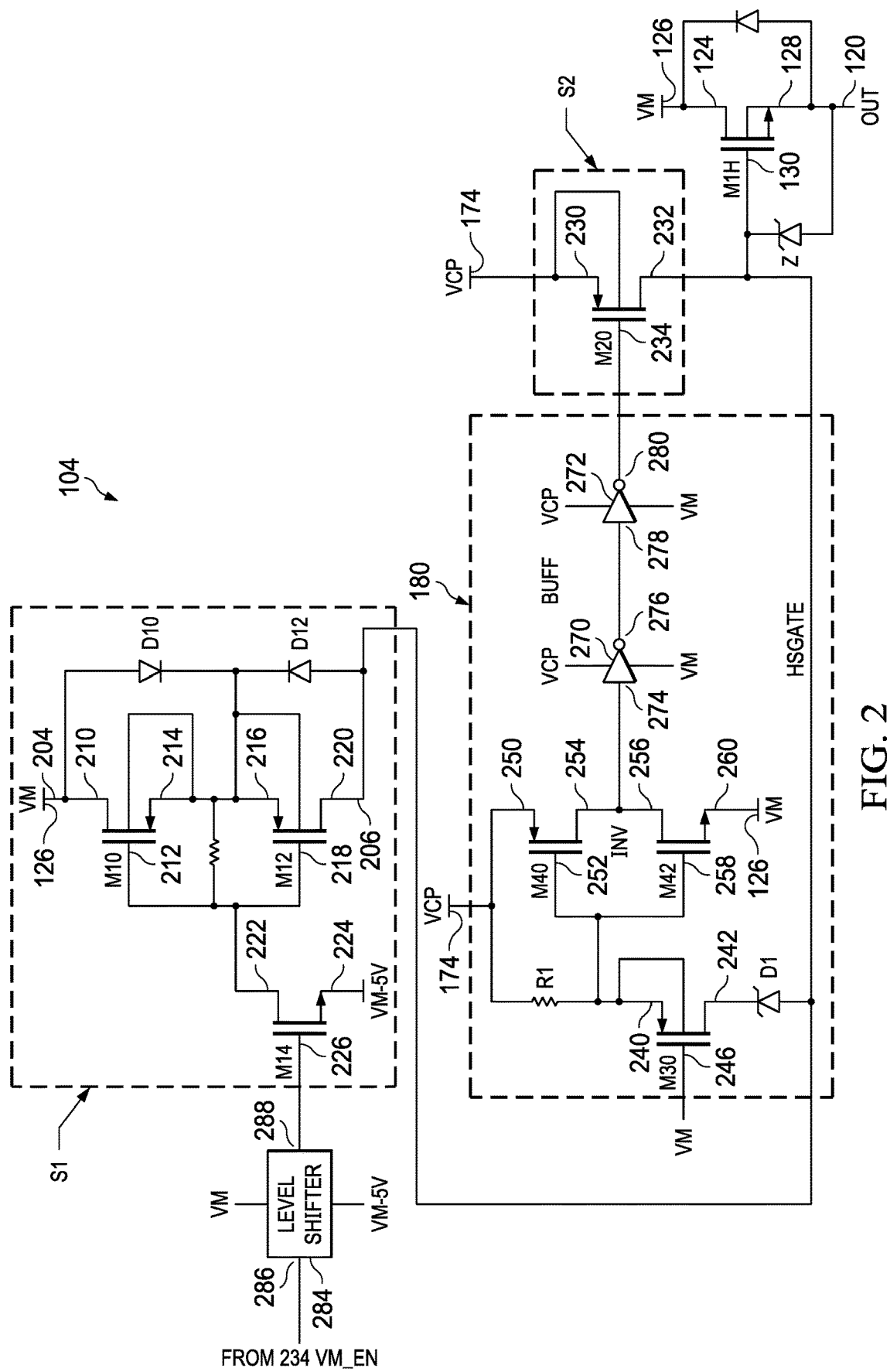
FIG. 2 is a schematic diagram of a driver circuit of an example embodiment.

FIG. 2 is a schematic diagram of the driver circuit 104 (or the driver circuit 108) of an example embodiment. The driver circuit 104 is configured to drive the high-side FET M1H. The high-side FET M1H is an NFET which has a drain 124, a source 128, and a gate 130. A Zener diode Z is connected between the high-side gate 130 and the source 128. The cathode of the Zener diode Z is connected to the high-side gate 130 and the anode of the Zener diode Z is connected to the source 128. The Zener diode Z is designed to allow current to flow backwards (cathode to anode) when a Zener voltage (e.g., >5V) is applied across Zener diode Z.

The driver circuit 104 includes a first switch S1 which has a first terminal 204 connected to the voltage supply terminal 126 and a second terminal 206 connected to the high-side gate 130. In an example embodiment, the first switch S1 is implemented with a PFET M10, a PFET M12, and an NFET M14. The PFET M10 has a drain 210 connected to the voltage supply terminal 126, a gate 212, and a source 214. The PFET M10 has a body diode D10. The PFET M12 has a source 216 connected to the source 214 of M10, a gate 218 connected to the gate 212 of M10, and a drain 220 connected to the high-side gate 130. The PFET M12 has a body diode D12. The NFET M14 has a drain 222 connected to the gates 212 and 218 of M10 and M12. The NFET M14 has a source 224 connected to a voltage level that is sufficiently low (e.g., VM-5V) to allow the NFET M14 to be turned on when a gate signal is applied to its gate 226.

The driver circuit 104 includes a second switch S2 which has a first terminal 230 connected to the charge pump terminal 174, a second terminal 232 connected to the high side gate 130, and a third terminal 234. In an example embodiment, the second switch S2 is implemented with a PFET M20 which has a source (230), a drain (232) and a gate (234).

The driver circuit 104 includes the comparison circuit 134 configured to compare the voltage at the high-side gate 130 to VM and in response control the operation of the switches S1 and S2. The comparison circuit 130 provides the voltage supply enable signal VM_EN if the voltage at the high-side gate 130 is lower than VM and provides the charge pump enable signal VCP_EN if the voltage at the high-side gate 130 is higher than VM.

In an example embodiment, the comparison circuit 180 is implemented with: (a) PFET M30; (b) an inverter INV comprising a PFET M40 and an NFET M42; and (c) a buffer BUFF comprising two inverting buffers 270 and 272. The PFET M30 has a source 240, a drain 242, and a gate 246. The gate 246 is connected to the supply voltage VM. A Zener diode D1 is connected between the high-side gate 130 and the drain 242. The anode of D1 is connected to the high-side gate 130 and the cathode of D1 is connected to the drain 242 of M30. A resistor R1 is connected between the source 240 and the charge pump terminal 174. The PFET M30 is configured as a source follower in which the voltage at the source 240 follows or tracks the higher of the voltage at the gate 246 and the voltage at the drain 242. When the source 240 is at a higher potential than the drain 242, current flows from the source 240 to the drain 242. The voltage at the source 240 is approximately one VGS (gate to source voltage) above the voltage at the gate 246. Because the voltage at the source 240 must also be greater than the voltage at the drain 242 in order for current to flow from the source 240 to the drain 242, the voltage at the source 240 is the higher of the voltage at the drain 242 and one VGS above the voltage at the gate 246.

The inverter INV is implemented with the PFET M40 and the NFET M42. The PFET M40 has a source 250 connected to the charge pump terminal 174, a gate 252 connected to the source 240 of the source follower PFET M30, and a drain 254. The NFET M42 has a drain 256 connected to the drain 254 of the PFET M40 and a gate 258 connected to the source 240 of the source follower PFET M30. The NFET M42 has a source 260 connected to the voltage supply VM terminal 126.

The buffer BUFF is implemented with the first and second inverting buffers 270 and 272 connected in series. The first inverting buffer 270 has an input 274 connected to the drain 254 of the PFET M40 and has an output 276 which is connected to the input 278 of the second inverting buffer 272. The output 280 of the second inverting buffer 278 is connected to the gate 234 of the PFET M20 (i.e., second switch S2). The first and second inverting buffers 270 and 272 are each powered by two different level of voltage supplies: VCP and VM. Thus, depending on the input, the first and second inverting buffers 270 and 272 provide either VCP or VM at their respective outputs 276 and 280.

The driver circuit 104 includes a level shifter 284 which has an input 286 connected to the output 280 of the second inverting buffer 272. The level shifter 284 has an output 288 connected to the gate of the NFET M14. The level shifter 284 is powered by two different level voltage supplies: VCP and VM-5V. Thus, depending on the input voltage, the level shifter 284 provides either VCP or VM-5 at the output 288.

In operation, if the voltage at the high-side gate 130 is low, the voltage at the source 240 of the source follower PFET M30 is VM+VGS, where VGS is the gate to source voltage of the PFET M30. The voltages at the gates 252 and 258 of M40 and M42, respectively, are also VM+VGS, which is lower then VCP. As a result, the PFET M40 is turned on but the NFET M42 is turned off, allowing VCP to appear at the input 274 of the first inverting buffer 270. The first inverting buffer 270 provides VM to the second inverting buffer 272, and the second inverting buffer 272 provides VCP to the gate 234 of the PFET M20 (i.e., second switch S2). As a result, the gate 234 and the source 230 of M20 are both at VCP, which causes the PFET M20 to turn off and disconnect VCP from the high-side gate 130. The output VCP provided by the second inverting buffer 272 which turns of the PFET M20 is also referred to as VCP_EN which turns off the PFET M20.

While the PFET M20 is turned off by applying VCP to the gate 234, VCP is also applied to the input 286 of the level shifter 284. The level shifter 284 provides VCP at the output 288 which is coupled to the gate 226 of the NFET M14. As a result M14 is turned on and provides VM-5V at the drain of M14, which causes the PFET M10 and PFET M12 to turn on. Thus, VM is connected to the high-side gate 130 via M10 and M12. As a result, the current flows from VM through M10 and M12 and charges the high-side gate 130. Since the cathode of the body diode D10 is connected to the cathode of the body diode D12, cross conduction between VCP and VM is prevented. The output VCP provided by the level shifter 284 which turns on the PFET M12 is also referred to as the VM_EN signal.

As the voltage at the high-side gate 130 rises, the voltage at the drain 242 of the PFET M30 rises. Since the PFET M30 is configured as a source follower, the source 240 of the PFET M30 also rises by following the drain 242. Because the gate 252 of the PFET M40 and the gate 258 of the NFET M42 are coupled to the source 240 of the source follower PFET M30, the NFET M42 is turned on but the PFET M40 is turned off. As a result, the first inverting buffer 270 provides VCP at the output 276 and the second inverting buffer 272 provides VM at the output 280 which is coupled to the gate 234 of the PFET M20 (i.e., second switch S2). Thus, the PFET M20 is turned on, connecting VCP to the high-side gate 130 and charging the high-side gate 130 to VCP. The output VM of the second inverting buffer 272, which turns on M20, is also referred to as VCP_EN.

As the high-side gate 130 is charged by VCP through the PFET M20, VM is applied to the input 286 of the level shifter 284. The level shifter 284 provides VM-5V at the output 288 which is coupled to the gate 226 of the NFET M14. As a result M14 is turned off, which causes the M10 and M12 to turn off, thereby disconnecting VM from the high-side gate 130.

In the event the first output 120 is short circuited to ground, the voltage at the high-side gate 130 drops to approximately 5V (Zener voltage is around 5V). As a result, the inverter INV provides VCP to the buffer BUFF, which in turn applies VCP to the gate 234 of the PFET M20, thereby turning off M20. Thus, the charge pump VCP is disconnected from the high-side gate 130, preventing VCP from dipping or collapsing.

Figure 3:
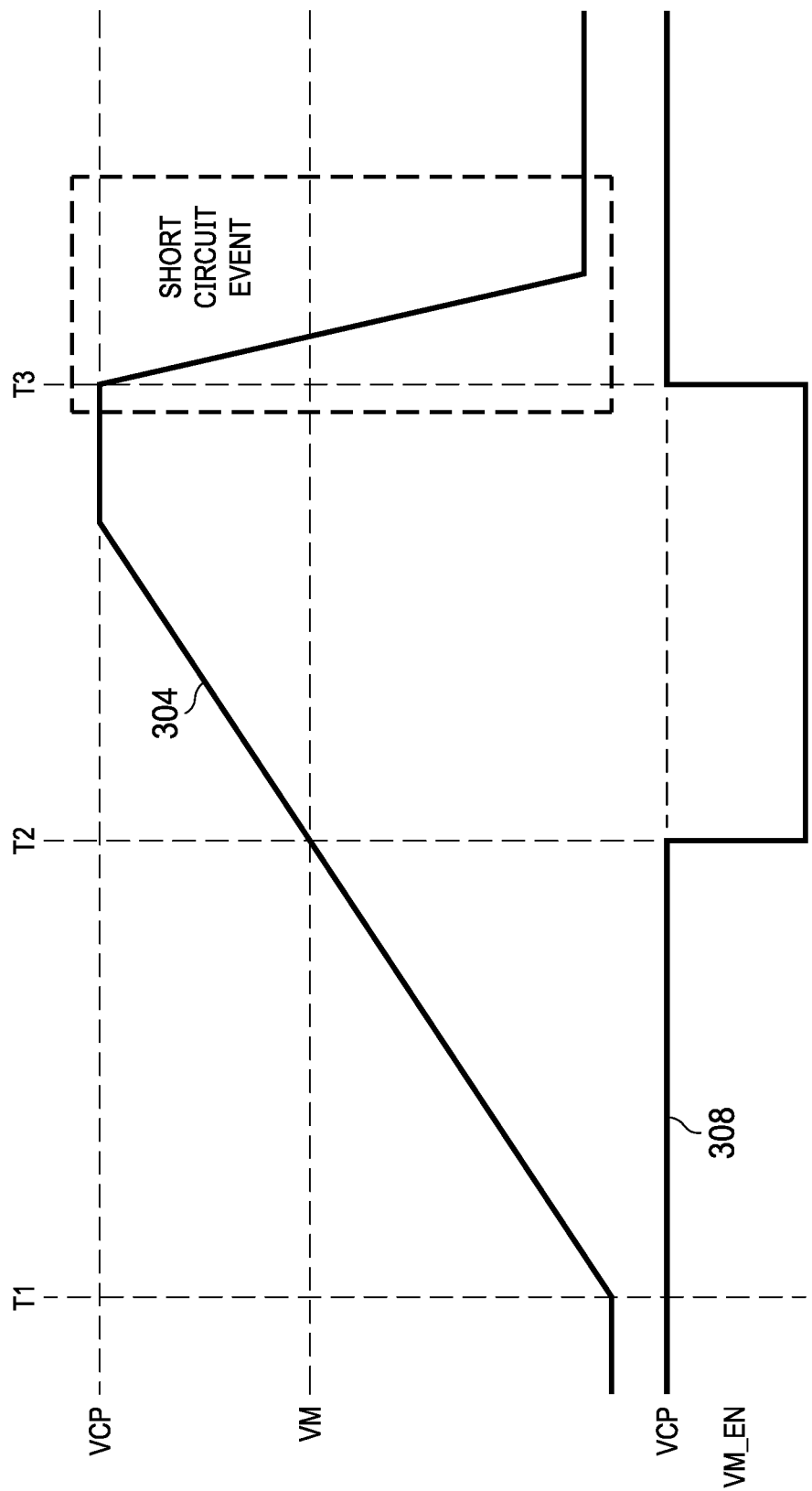
FIG. 3 illustrates waveforms of signals in the driver circuit of FIG. 2.

FIG. 3 illustrates voltage 304 at the high-side gate 130 and voltage 308 at the gate 234 of the PFET M20 in operation. Since driver circuits 104 and 108 are the same in some example embodiments, a voltage similar to voltage 304 would be applied at the high-side gate 132 and a voltage similar to voltage 308 would be utilized in driver circuit 108. Initially, voltage 304 at the high-side gate 130 is low and voltage 308 is approximately VCP. Thus, the PFET M20 is disconnected from the high-side gate 130, and the high-side gate 130 is charged by VM. At time T1, voltage 304 at the high-side gate 130 begins to rise, and at time T2, voltage 304 at the high-side gate 130 rises to around VM. Thus, the PFET M20 is turned on by applying voltage 308 (VM) at the gate 234 of M20. The high-side gate 130 is connected to VCP, causing voltage 304 at the high-side gate 130 to rise from VM to VCP.

At time T3, the output 120 is short circuited to ground. As a result, voltage 304 drops but voltage 308 at the gate 234 of M20 rises to VCP, thereby disconnecting VCP from the high-side gate 130.

Variations to the driver circuit 104 within the scope of the disclosure are possible. For example, an additional resistor (not shown in FIG. 2) may be coupled in series between the charge pump VCP and the drain 230 of the PFET M20 to reduce current drawn from the charge pump VCP after the high-side FET M1H transitions from the FET enhancement region. A timer circuit (not shown in FIG. 2) may be utilized which bypasses the additional resistor when the FET M1H is in the enhancement region. The timer circuit may be implemented by a monoshot circuit which has a time period defined by an RC time constant. In an example embodiment, the RC time constant is set greater than the duration in which M1H remains in the FET enhancement region. The monoshot circuit provides a pulse which turns on a switch to bypass the additional resistor when M1H is in the enhancement region. After the time period (i.e., RC time constant) the monoshot circuit returns to its stable state, which turns off the switch. Thus, the additional resistor is not bypassed, which reduces current drawn from the charge pump VCP.

In this description, the term "couple" may cover connections, communications, or signal paths that enable a functional relationship consistent with this description. For example, if device A provides a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal provided by device A. Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

As used herein, the terms "terminal", "node", "interconnection" and "pin" are used interchangeably. Unless specifically stated to the contrary, these terms are generally used to mean an interconnection between or a terminus of a device element, a circuit element, an integrated circuit, a device or other electronics or semiconductor component.

While certain components may be described herein as being of a particular process technology, these components may be exchanged for components of other process technologies. Circuits described herein are reconfigurable to include the replaced components to provide functionality at least partially similar to functionality available before the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor. Also, uses of the phrase "ground terminal" in this description include a chassis ground, an Earth ground, a floating ground, a virtual ground, a digital ground, a common ground, and/or any other form of ground connection applicable to, or suitable for, the teachings of this description. Unless otherwise stated, "about", "approximately", or "substantially" preceding a value means +/−10 percent of the stated value.

Modifications are possible in the described embodiments, and other embodiments are possible, within the scope of the claims.

What is claimed is:

1. A driver circuit for supplying a drive signal to a gate of a high-side transistor, the driver circuit comprising:
   a first switch having a first terminal adapted to be coupled to a voltage supply terminal and a second terminal coupled to the gate, the first switch operable to couple the voltage supply terminal to the gate responsive to receiving a voltage supply enable signal;
   a second switch having a first terminal coupled to a charge pump terminal and a second terminal coupled to the gate, the second switch operable to couple the charge pump terminal to the gate responsive to receiving a charge pump enable signal; and
   a comparison circuit having a first terminal coupled to the gate and a second terminal adapted to be coupled to the voltage supply terminal, the comparison circuit operable to provide the voltage supply enable signal when the voltage at the gate is lower than a supply voltage and to provide the charge pump enable signal when the voltage at the gate is higher than the supply voltage.

2. The driver circuit of claim 1, wherein responsive to receiving the voltage supply enable signal, the first switch is closed to charge the gate to the supply voltage.

3. The driver circuit of claim 1, wherein responsive to receiving the charge pump enable signal, the second switch is closed to charge the gate to a charge pump voltage.

4. The driver circuit of claim 3, wherein the charge pump voltage is higher than the supply voltage.

5. The driver circuit of claim 1, wherein the first switch is operable to disconnect the voltage supply terminal from the gate when the second switch is closed.

6. The driver circuit of claim 1, wherein the second switch is operable to disconnect the charge pump terminal from the gate when the first switch is closed.

7. The driver circuit of claim 1, wherein the charge pump terminal is connected to a charge pump supply.

8. The driver circuit of claim 1, wherein the voltage supply terminal is connected to a voltage supply.

9. A motor-drive circuit comprising:
   a first high-side transistor having a first control terminal and coupled between a voltage supply terminal and a first output adapted to be coupled to a motor;
   a second high-side transistor having a second control terminal and coupled between the voltage supply terminal and a second output adapted to be coupled to the motor;
   a first low-side transistor coupled between the first output and a ground terminal;
   a second low-side transistor coupled between the second output and the ground terminal;
   a first switch having a first terminal coupled to the voltage supply terminal and a second terminal coupled to the first control terminal, the first switch operable to connect the voltage supply terminal to the first control terminal responsive to receiving a voltage supply enable signal;
   a second switch having a first terminal coupled to a charge pump terminal and a second terminal coupled to the first control terminal, the second switch operable to couple the charge pump terminal to the first control terminal responsive to receiving a charge pump enable signal; and
   a comparison circuit having a first terminal coupled to the first control terminal and a second terminal coupled to the voltage supply terminal, the comparison circuit operable to provide the voltage supply enable signal when the voltage at the first control terminal is lower than a supply voltage and to provide the charge pump enable signal when the voltage at the first control terminal is higher than the supply voltage.

10. The motor drive circuit of claim 9, wherein responsive to receiving the voltage supply enable signal, the first switch is closed to charge the first control terminal to the supply voltage.

11. The driver circuit of claim 9, wherein responsive to receiving the charge pump enable signal, the second switch is closed to charge the first control terminal to a charge pump voltage.

12. The driver circuit of claim 9, wherein the charge pump voltage is higher than the supply voltage.

13. The driver circuit of claim 9, wherein the first switch is operable to disconnect the voltage supply terminal from the first control terminal when the second switch is turned on.

14. The driver circuit of claim 9, wherein the second switch is operable to disconnect the charge pump terminal from the first control terminal when the first switch is turned on.

15. A driver circuit for driving a high-side transistor that has a high-side gate, the driver circuit comprising:
   a first switch having a first terminal coupled to a voltage supply terminal, a second terminal coupled to the high-side gate, and a third terminal;
   a second switch having a first terminal coupled to a charge pump terminal, a second terminal coupled to the high-side gate, and a third terminal;
   a first PFET having a source coupled to the charge pump terminal, a drain, and a gate;
   a first NFET having a drain coupled to the source drain of the first PFET, a source coupled to the voltage supply terminal, and a gate coupled to the gate of the first PFET;
   a resistor coupled between the charge pump terminal and the gate of the first PFET;
   a buffer having an input coupled to the drain of the first PFET and an output coupled to the third terminal of the second switch;
   a source follower PFET having a source coupled to the gate of the first PFET, a gate coupled to the voltage supply terminal, and a drain;
   a diode coupled between the drain of the source follower PFET and the high-side gate; and
   a level shifter having an input coupled to the output of the buffer circuit and an output coupled to the third terminal of the first switch.

16. The driver circuit of claim 15, wherein the first switch is coupled to receive a voltage supply enable signal at the third terminal and operable to connect the voltage supply terminal to the high-side gate responsive to receiving the voltage supply enable signal.

17. The driver circuit of claim 15, wherein the second switch is coupled to receive a charge pump enable signal at the third terminal and operable to connect the charge pump terminal to the high-side gate responsive to receiving the charge pump enable signal.

18. The driver circuit of claim 15, wherein the level shifter is operable to provide the voltage supply enable signal if the voltage at the high-side gate is lower than a supply voltage.

19. The driver circuit of claim 15, wherein the buffer is operable to provide the charge pump enable signal if the voltage at the high-side gate is higher than a supply voltage.

20. The driver circuit of claim 15, wherein responsive to receiving the voltage supply enable signal, the first switch is closed to charge the high-side gate to the supply voltage.

21. The driver circuit of claim 15, wherein responsive to receiving the charge pump enable signal, the second switch is closed to charge the high-side gate to a charge pump voltage.

22. The driver circuit of claim 15, wherein the first switch comprises:
   a second PFET having a drain coupled to the voltage supply terminal, a gate and a source;
   a third PFET having a source coupled to the source of the second PFET, a gate coupled to the gate of the second PFET, and a drain coupled to the high-side gate; and
   a third NFET having a drain coupled to the gates of the second PFET and the third PFET, a source coupled to the supply voltage, and a gate coupled to the output of the level shifter.

23. The driver circuit of claim 15, wherein the second switch is a PFET having a source coupled to the charge pump terminal, a drain coupled to the high-side gate, and a gate coupled to the output of the buffer.

24. The driver circuit of claim 15, wherein the charge pump terminal is coupled to a charge pump voltage.

25. The driver circuit of claim 15, wherein the voltage supply terminal is coupled to a voltage supply.

* * * * *